United States Patent [19]

Kamakura

[11] 4,262,990
[45] * Apr. 21, 1981

[54] BINOCULAR

[76] Inventor: Ichiro Kamakura, c/o Kamakura Kohki Kabushiki Kaisha, of No. 6-12, Tsukagoshi 3-Chome, Warabi-Shi, Saitama-Ken, Japan

[*] Notice: The portion of the term of this patent subsequent to Oct. 23, 1996, has been disclaimed.

[21] Appl. No.: 12,894

[22] Filed: Feb. 16, 1979

[51] Int. Cl.³ .............................................. G02B 7/04
[52] U.S. Cl. ..................................... 350/44; 350/47; 350/76
[58] Field of Search ....................... 350/40, 41, 42, 43, 350/44, 46, 47, 74, 75, 76, 77

[56] References Cited

U.S. PATENT DOCUMENTS 4,171,865  10/1979  Kamakura ............................... 350/41

FOREIGN PATENT DOCUMENTS 1203976  10/1965  Fed. Rep. of Germany ............ 350/77

Primary Examiner—John K. Corbin
Assistant Examiner—Matthew W. Koren
Attorney, Agent, or Firm—Michael J. Striker

[57] ABSTRACT

The present invention relates to a binocular having a first operating member and a second operating member for operating a zooming mechanism and a focussing mechanism respectively, wherein the first and second operating members are mounted in a tandem form on a center axis coupling a pair of telescopes, one of the two operating members being operated in a seesaw motion, while the other operating member being operated by rotation. Since the two operating members are apparently distinguishable from each other on the center axis, both the zooming and focussing operations are carried out smoothly and accurately.

5 Claims, 7 Drawing Figures

BINOCULAR

BACKGROUND OF THE INVENTION

A normal type of binocular comprises a focusing mechanism and a zooming mechanism. When a viewer uses this kind of binocular he or she must operate a focusing member and a zooming member while holding a pair of telescopes. Then, the binocular body is apt to be vibrated due to a certain shaking of either fingers or hands. Thus, an object for viewing is out of focusing and zooming. Particularly, while increasing the magnification by operating the zooming member, it becomes difficult to catch the object exactly. From this point of view, how to enhance the binocular's operability is required in this industry. In order to solve the problem of operability, I have filed a Patent application both in Japan and abroad, wherein a focusing device and a zooming device are mounted in parallel with each other on a center axis between two telescopes. Referring to the prior art which is within the spirit and scope of this invention, the following references can be cited: U.S. Pat. Nos. 4,066,329, 2,988,955, 3,069,972, 2,988,974, etc. However, in any one of the above cited references, there exists no concept that the focusing member and the zooming member are mounted in a tandem form on an axis coupling the two telescopes. In other words, in any one of them a viewer holding a pair of telescopes is obliged to operate the zooming member and the focusing member individually which are disposed separately from each other. In other words, when the above two operating members are mounted tandemly on the center axis coupling the two telescopes, they are easily contacted and simultaneously operated by the user's fingertips while holding a pair of telescopes by both hands. Thus, such a tandem disposition of the two operating members is very natural and suitable in view the finger motion and the proper structure of the binocular.

SUMMARY OF THE INVENTION

Accordingly, it is a general object of this invention to provide a binocular wherein both a focusing member and a zooming member are mounted tandemly on a center axis coupling a pair of telescopes, one of the two operating members having a pair of generally flattened platforms to be operated in seesaw motion and the other operating member having a ring to be rotatable. Each of the two flattened platforms is tiltable by a user's fingertips, thereby being movable in a seesaw motion. And either the zooming range or the focusing range is within the tilting range of the two flattened platforms.

Preferably, the operating member having a pair of platforms to be operated in a seesaw motion is applied for the zooming mechanism to be operated speedily, while the ring-shape member is applied for the focusing mechanism requiring accuracy. The above technological structure may contribute to the betterment of operability of the binocular according to this invention, but not always absolutely indispensable. The vice versa structure is also available.

It is another object of this invention to provide a binocular in which both the focusing member and the zooming member are mounted tandemly on a center axis coupling a pair of telescopes, thereby each function of the two devices being apparently distinguishable from each other in view of the shape as well as the operating system. Accordingly, even a user who is not accustomed to the binocular can operate both the two operating members without mistakes.

Other and further object, features and advantages of the invention will appear more fully from the following description with reference to the accompanying drawings.

DETAILED DESCRIPTION OF PREFERRED EMBODIMENT

Figure 1:
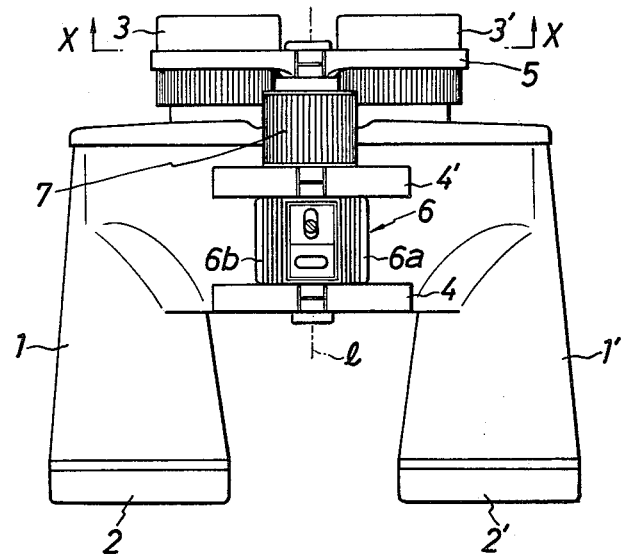
FIG. 1 is a plan view of a binocular according to this invention.
Figure 2:
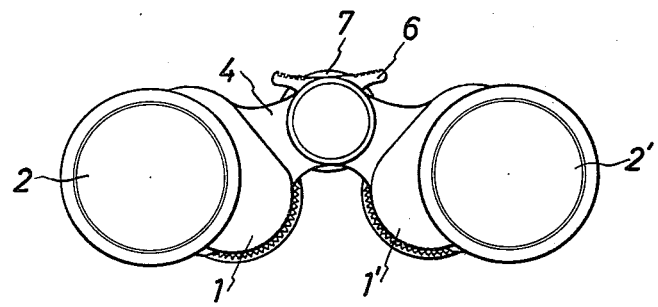
FIG. 2 is a front view thereof.

As shown in FIGS. 1 and 2, a pair of telescopes 1, 1' hinged with each other are rotatable about a center axis l, thereby an interpupillary space being adjusted. A pair of telescopes 1, 1' has a pair of objective lenses 2, 2' and a pair of ocular lenses 3, 3' respectively.

In the present embodiment, a focusing adjustment is carried out by sliding a pair of ocular lenses 3, 3' from or toward a pair of objective lenses 2, 2'. As will be described hereinafter, a pair of ocular lenses 3, 3' is slidable by a focusing member.

A pair of telescopes 1, 1' are hinged by two arms 4, 4' and a pair of ocular lenses 3, 3' are hinged by an arm 5. The two telescopes 1, 1' and two ocular lenses 3, 3' are rotatable about an axis l passing through the centers of the arms 4, 4' and 5.

The first arm 4 and the second arm 4' are linked with each other so as to be rotated about a center tubular shaft 71 fitted in two tapered holes 4h, 4h' bored in the respective arms 4, 4'. The first operating member 6 for actuating a zooming member Z is disposed between the first and second arms 4, 4' while a second operating member 7 for actuating a focusing mechanism F is disposed between the second and third arms 4' and 5. The first and second operating members 6, 7 are disposed tandemly on the center axis l. The first operating member 6 has a pair of generally flattened platforms 6a, 6b to be operated in a seesaw motion by a user's figertips, while the second device 7 is of a ring shape for rotation.

The operational relationship between the zooming mechanizm Z and the focusing mechanism F to be driven by the first and second operating members 6, 7 will now be described.

When tilting the two platforms 6a, 6b of the first operating member by fingertips 6 in a seesaw way, a rotation shaft 61 is rotated within an angle corresponding to the tilting range set previously, thereby a pair of zooming lenses (not illustrated) being moved by an output gear 8 of an over-drive gear means.

Figure 3:
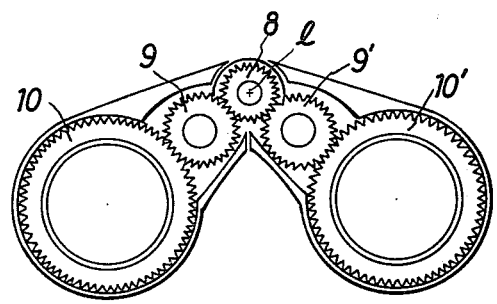
FIG. 3 is an enlarged section view taken at line X—X of FIG. 1.

As shown in FIG. 3, by actuating the output gear 8 the zooming adjustment is made by the rotation of larger gears 10, 10' by way of intermediatory gears 9, 9'. Since this mechanism is a known art, the detailed explanation will be omitted. The two larger gears 10, 10' are incorporated in and fixed with the leftside and rightside zoom lenses wherein there is built-in cam means for converting the above rotation into a linear or back and forth movement on an optical axis. Thus, by rotating the output gear 8, a pair of zoom lenses are moved to a linear movement, a suitable zooming being obtained. On the other hand, when rotating the second operating member 7 of ring-shape, the rotation shaft 61 and the over-drive gear means can be moved back and forth since the output gear 8 is hinged with the arm 5. Accordingly, by moving back and forth a pair of ocular lenses 3, 3' linked with each other by the third arm 5, a suitable focusing is obtained.

The structure of the zooming mechanism Z will now be described in detail. The zooming mechanism Z has the first operating member 6 mounted rotatably on a center tubular shaft 71. The first operating member 6 has a pair of generally flattened platforms 6a, 6b made of preferred plastic resin, between which there is perforated a lengthy opening 6c to an axial direction 1. The lengthy opening 6c is engaged with a cam pin 62 communicating the actuation of the first operating member 6 to the over-drive gear means. The cam pin 62 is fixed with a side wall of a larger mounting cylinder 6e which is fixed by a setting screw 6d with an end 6z of the rotation shaft 61 which is an input shaft of the over-drive gear means. In this condition the cam pin 62 is penetrating through an angular hole 72.

A ring-shape spacer 6f supporting the end 6z of the rotation shaft 61 in sliding with the interior of the center tubular shaft 71 is fixed with the end of the cam pin mounting cylinder 6e.

Figure 4:
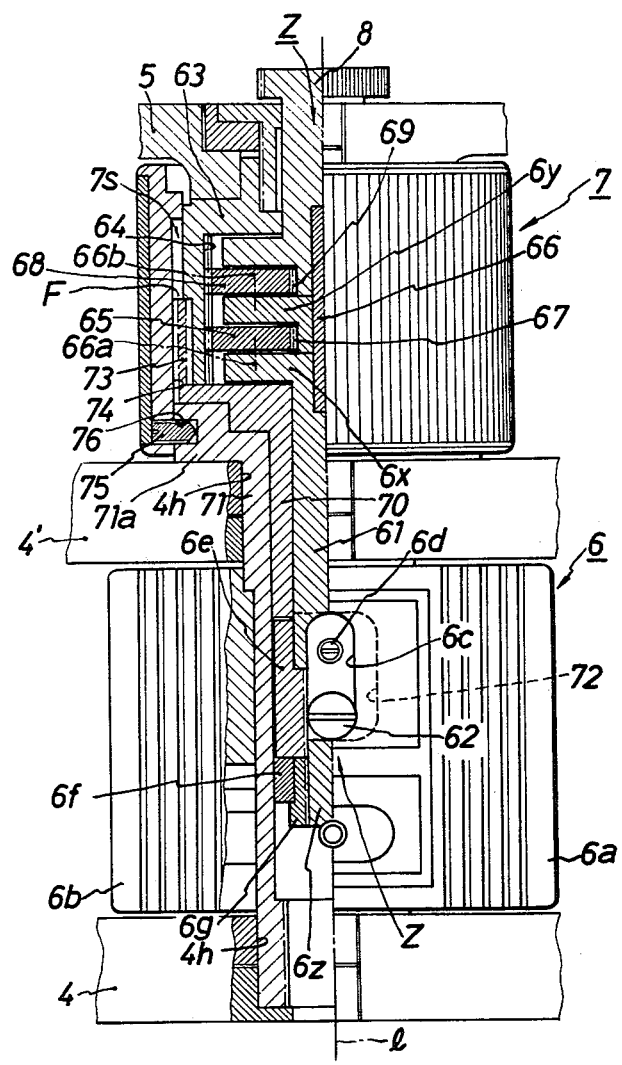
FIG. 4 is a partially vertical section view of a zooming mechanism and a focusing mechanism of the above binocular.
Figures 5, 6:
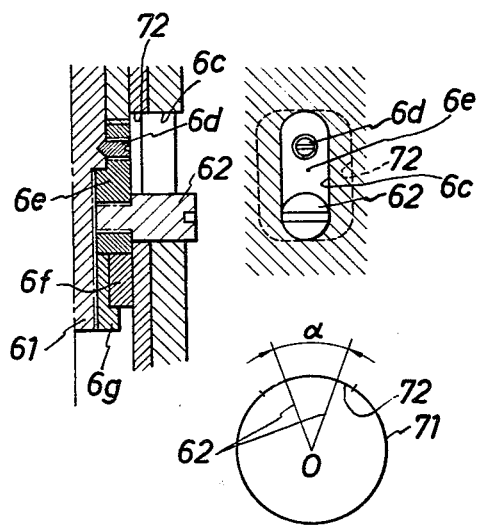
FIG. 5 is a section view of a cam pin mounting of the above zooming mechanism.
FIG. 6 is a plan view thereof.

The latter half portion of the rotation shaft 61 at the side of the ocular lenses becomes an input shaft of the over-drive gear means incorporated inside the second operating member 7. The over-drive gear means incorporated inside the second operating member 7. The over-drive gear means is incorporated in a housing 63 disposed at the side of the arm 5 securing a pair of ocular lenses 3, 3'. The housing 63 has an internal gear 64 on its internal circumference. Two planetary gears 65 rotatable about the center axis 1 in engaging with the internal gear 64 are engaged with a support 6x projected radiously from the end of the rotation shaft 61, said planetary gears 65, 65 being disposed transversely in relation with an axis. Numeral 66 is a core rod of the over-drive gear means, of which two ends are fixed with the output shaft gear 8 and the rotation shaft 61 respectively. Numeral 66a is a shaft for mounting the planetary gear 64 on the support 6x. As shown in FIG. 4, the over-drive gear means is of a two-stage structure. Accordingly, the planetary gear 65 for the first stage, and the sun gear 67 to be engaged with the internal gear 64 is rotated integrally with the support 6y for the second stage. Two planetary gears 68, 68 for the second stage to be engaged with the internal gear 64 as well as the sun gear 69 for the second stage are mounted on the support 6y by a pin 66b. The sun gear 69 for the second stage is rotated together with the output shaft gear 8. This is a known gear transmission mechanism as shown in FIG. 3.

Further, to a front end of the housing 63 of the over-drive gear means there is mounted an insert 70 fitted between the rotation shaft 61 and the tubular shaft 71 fixed with the focusing mechanism F by a screw. As will be described hereinafter, the insert 70 for supporting the rotation shaft 61 is part of the focusing mechanism F.

From the above description it is to be understood that the rotation shaft 61 is rotated by way of the cam pin 62 mounted in the lengthy opening 6c by actuating the first operating member 6.

Figure 7:
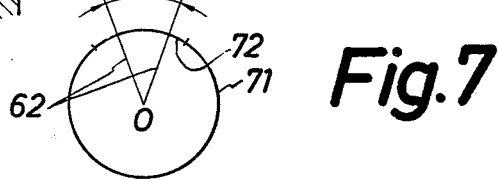
FIG. 7 is a view showing a tilting range of the cam pin in FIG. 5.

The tilt range of the first operating member 6 is defined by an opening angle $\alpha$ for an axis point O of an approximately rectangular 72 overlapping to the lengthy opening 6c. (Refer to FIG. 7).

The structure of the focusing mechanism F will now be described. The focusing mechanism F includes the second operating member, an internal lead thread 73 formed on an internal wall of the second operating ring 7 and an external lead thread 74 to be engaged with the internal lead thread 73. The external lead thread 74 is mounted on an external circumference of the insert 70 forming the front of the housing 63. Since the housing 63 is moved back and forth together with the arm 5, in mutual engagement of the lead threads 73, 74 the housing 63 and the zooming mechanism incorporated therein are moved back and forth. The second operating ring 7 has one or more guide pins 75 each being projecting inwardly. The pin 75 is slidably fitted in a guide groove 76 formed an external circumference of a flange 71a of the tubular shaft 71. Under the foregoing structure, the rotational movement of the second operating member 7 can be converted to a back and forth movement of the arm 5 i.e. a focusing movement. This adjusting amount is mainly defined by an axial length of the lengthy opening 6c. In FIG. 4 the cam pin 61 is facing to the limit of a forward movement, thereby a space 7s occurring behind the lead threads 73, 74.

The function of this invention will now be described. The binocular according to this invention is operated by both hands while holding a pair of housings 1, 1' therein. Then, the two flattened platforms 6a, 6b of the first operating member 6 are contacted by a viewer's middle fingers, while the second operating member of ring-shape is rotated by the forefingers. Accordingly, while holding the binocular by other fingers and in the palm, a smooth zooming and focusing operation is obtained.

When tilting the first operating member 6 leftwards or rightwards, the cam screw 62 and the rotation shaft 61 are integrally rotated, the planetary gear 65 for the first stage being rotated in engagement with the internal gear 64. The sun gear 67 for the first stage to be engaged with the planetary gear 65 is driven speedily as per the gear ratio of the both gears, subsequently the planetary gear 68 for the second stage is rotated on its own axis in engagement with the internal gear 64. Thus, the sun gear 69 of the second stage is driven speedily. Due to the overdriven rotation output at the second stage, a pair of zoom lenses in the two housings of the leftside and rightside ocular lenses 3, 3' are driven through the gear transmission as shown in FIG. 3, whereby a speedy and smooth zooming operation is conducted by tilting the first operating member 6 leftwards or rightwards although its tilting range is so limited.

Once a preferred magnification has been set by the zooming operation, the focusing operation can be carried out very easily. Only due to a clockwise or anti-clockwise rotation of the second operating member, the mechanical members at the side of the housing 63 are moved back and forth by a dimension equivalent to the lead angle of the lead threads 73, 74. This back and forth movement causes the arm 5 and a pair of ocular lenses 3, 3' fixed therewith to be moved back and forth, thereby a smooth focusing operation in the zoom lenses being carried out.

As described above, according to this invention, a first operating member and a second operation member which are respectively adaptable for the zooming and focusing operations are mounted tandemly on a center axis of the binocular, one of the two operating members being tiltable in a seesaw motion, while the other being rotatable. Under the above structure, holding a pair of telescopes by both hands, the user can operate the two different operating members mounted tandemly on the center axis. Such a disposition of the two operating members is desirable for the motion of fingers. Further, the two operating members are mounted in the proximity of the center of gravity of the binocular, so that the vibration during the operation can be avoided remarkably.

What is claimed is:

1. A binocular having a first operating member and a second operating member for operating a zooming mechanism and a focusing mechanism respectively, the first operating member and the second operating member being mounted in tandem on a center axis coupling a pair of telescopes of said binocular, one of the two operating members being operated in a seesaw motion, while the other operating member is operated by rotation.

2. A binocular as claimed in claim 1, wherein the first operating member to be operated in a seesaw motion is interlocked to the zooming mechanism.

3. A binocular as claimed in claim 1, wherein the second operating member operated by rotation is interlocked to the focusing mechanism.

4. A binocular as claimed in any one of claims 1 to 3, wherein the zooming mechanism has an output shaft of an over-drive gear means to be driven by the first operating member.

5. A binocular claimed in any one of claims 1 to 3, wherein the focusing mechanism has a plurality of lead threads for converting the rotation of the second operating member into a linear movement and a plurality of members for transmitting the linear movement to a pair of ocular lenses.

* * * * *